Patented Oct. 13, 1925.

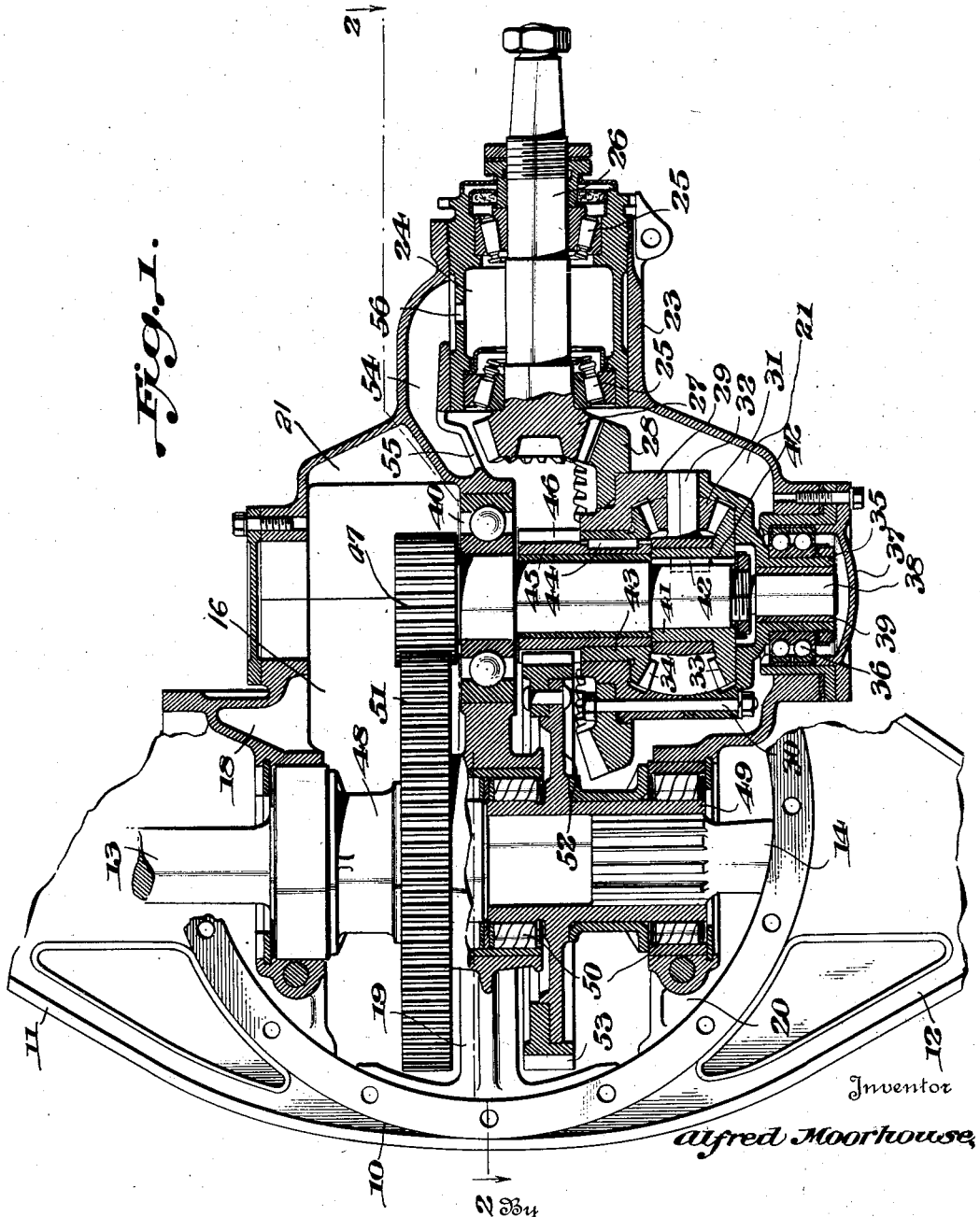

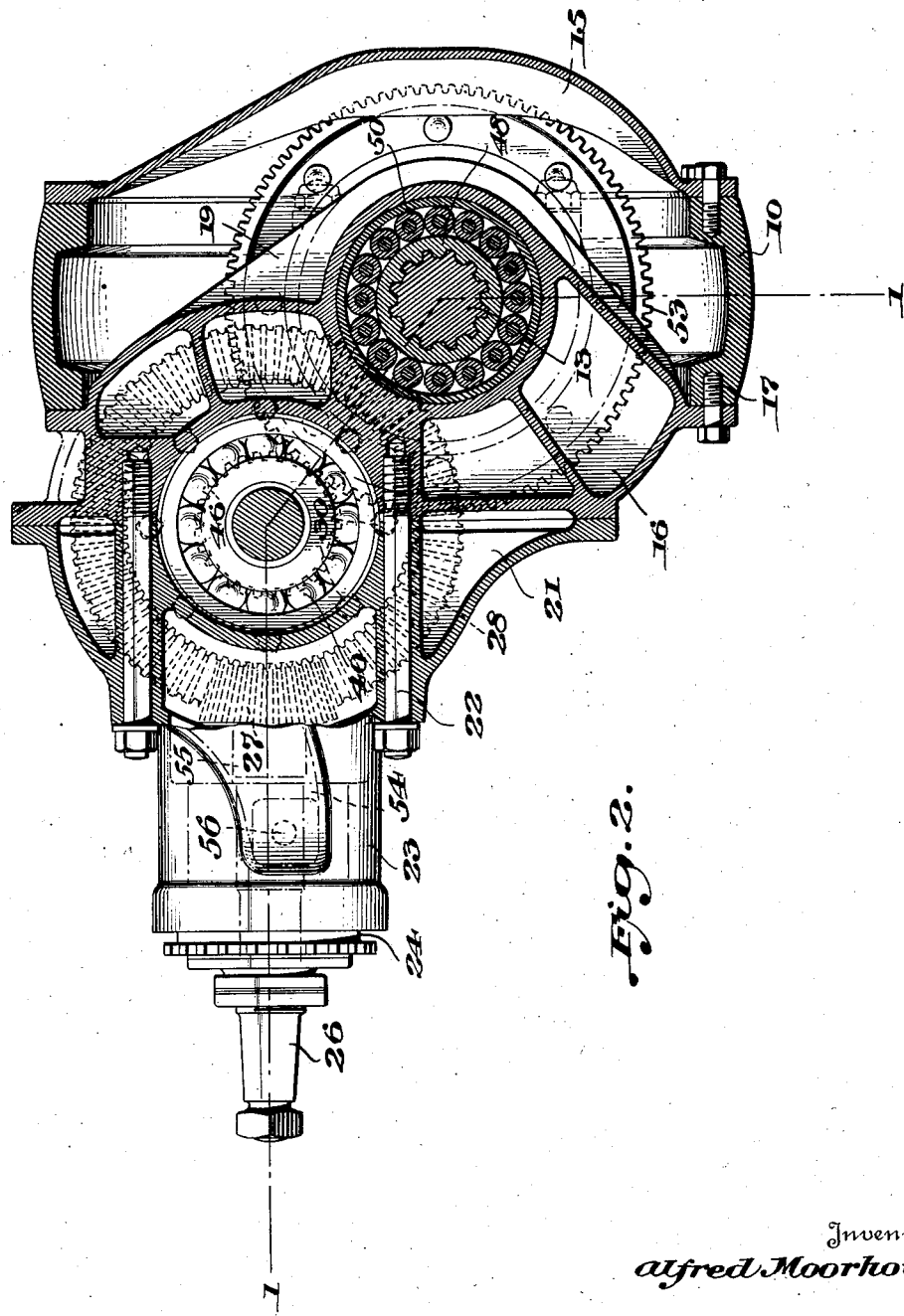

1,556,707

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed May 21, 1921. Serial No. 471,519.

*To all whom it may concern:*

Be it known that I, ALFRED MOORHOUSE, a citizen of the United States, and resident of Detroit, Wayne County, State of Michigan, have invented certain new and useful Improvements in Motor Vehicles, of which the following is a specification.

This invention relates to motor vehicles and particularly to the driving axle construction.

One of the objects of the invention is to provide an axle drive of the double reduction type having the parts so constructed and arranged as to give a maximum road clearance.

Another object of the invention is to provide a double reduction axle drive in which the gearing is compactly arranged and will occupy a minimum amount of space.

Another object of the invention is to provide means for efficiently lubricating the rotating parts of axle driving mechanism.

Another object of the invention is to so construct and arrange the differential mechanism of a rear axle drive with respect to the drive shaft and the driven shafts as to reduce to a minimum the torque on the differential.

Further objects of the invention will appear from the following description taken in connection with the drawings, which form a part of this specification, and in which:

Figure 1 is a horizontal sectional view, taken substantially on line 1—1 of Figure 2, of a rear axle constructed in accordance with the invention; and Figure 2 is a vertical sectional view of the construction shown in Figure 1 and taken substantially on line 2—2 of Figure 1.

The rear axle casing as shown in Figure 2, comprises four sections. Section 10 of the casing forms the main body of the rear axle and has secured thereto or formed integral therewith, laterally extending tubular sections 11 and 12, which house the axle shaft sections 13 and 14. A cover plate 15 is secured to the rear face of the central portion of section 10 and casing section 16 is secured by suitable bolts 17 to the front face of section 10. The section 16 has three vertically disposed webs 18, 19 and 20, having suitably aligned openings therein to provide bearings for the axle shaft sections and for the other rotating parts. A casing section 21 is secured by bolts 22 to the section 16, this latter casing having a forwardly extending portion 23 which forms a housing for a sleeve 24 in which are mounted roller bearings 25 for the drive shaft 26.

The shaft 26 is connected in any suitable manner to the motor of the vehicle and has secured to, or formed on its rear end, a bevel gear 27 which meshes with the bevel gear 28 secured to a differential housing 29 by any suitable means, such as bolts 30. As will be seen from the showing in Figure 1, the housing 29 is offset laterally from the shaft 26, but as shown in Figure 2, the center line or axis of rotation of the housing 29 is disposed in a plane in alignment with the plane of the shaft 26.

The differential housing 29 carries differential pinions 31 mounted on pinion shafts 32 and meshing with differential gears 33 and 34. The housing 29 has formed on one end thereof an outwardly extending sleeve 35 which is mounted in ball bearings 36 carried by the casing members 16 and 21. A cover plate 37 closes the opening in the axle casing in which the ball bearings are located. A shaft 38 is mounted in a bushing 39 carried by the sleeve 35 and extends laterally through the housing 29, the opposite end of the shaft being mounted in bearings 40, also carried by the casing sections.

Differential gear 33 has formed thereon a sleeve 41 keyed as shown at 42 to the shaft 38, and differential gear 34 has formed thereon a sleeve 43 keyed as shown at 44 to a hollow shaft or sleeve 45, which in turn has formed on, or secured to, its opposite end a spur gear 46. A spur gear 47 is secured to the free end of the shaft 38, the gears 46 and 47 being disposed co-axially and in alignment with each other and being exactly the same in construction.

The axle shaft sections 13 and 14 are withdrawably splined respectively to sleeves 48 and 49 mounted in roller bearings 50 disposed in the webs 18, 19 and 20. Sleeve 48 has formed thereon a laterally extending flange to which is secured a spur gear 51 meshing with gear 47. Sleeve 49 has formed thereon a laterally extending flange 52 to which is secured a spur gear 53 which in turn meshes with the gear 46.

This driving gearing above described runs in oil and provision is made whereby the oil which lubricates the gearing may be conducted to the bearings of the drive shaft 26, since it has been found that these bearings have a tendency to run dry and this is particularly true of the front bearing. In order to conduct the oil to the bearings 25, an opening or recess 54 is formed in the casing section 21 and this opening or recess communicates at one end through an opening 55 with the main body of the axle casing in which the oil is contained, and at its opposite end communicates through an opening 56 in the sleeve 24 with the roller bearings 25.

The drive is communicated from the drive shaft 26 to the axle sections 13 and 14 in the following manner: As the shaft 26 is driven by power derived from the motor, power is transmitted through the gears 27 and 28 to the differential housing 29 and thence through differential pinions 31 to the differential gears 33 and 34. From the gear 33 power is transmitted to a shaft 38 and from this shaft through spur gears 47 and 51 to the axle section 13. From the differential gear 34, power is transmitted through the sleeve 45 and spur gear 46 to the gear 53 and thence to the axle section 14. Thus it will be seen that two reductions in speed are obtained and it will be evident from the manner of mounting and from the location of the differential mechanism on an intermediate shaft instead of directly on the rear axle shaft, that the torque on this mechanism will be materially lessened.

It will also be seen that the particular construction and arrangement of the drive shaft differential mechanism and axle shaft sections, the axle construction will give a maximum road clearance. It will further be noted that the driving mechanism described and illustrated is very compactly arranged and occupies a minimum amount of space.

While I have, in the above specification, described one specific embodiment of my invention, it will be understood that the invention is capable of modification and that changes in the construction and in the arrangement of the various parts may be made without departing from the spirit or scope of the invention as expressed in the following claims.

Having described my invention, what I claim and desire to secure by Letters Patent is:

1. In a driving axle, a drive shaft, driven shafts, differential gearing operatively connected to said drive shaft, spur gears splined on the driven shafts operatively connected to the differential gearing, and bearings on each side of each of said spur gears and adjacent thereto, the gears being mounted in the bearings independently of the shafts.

2. In a driving axle, a drive shaft, axially aligned driven shafts, spur gears splined on each of said driven shafts, bearings for said gears on each side thereof and adjacent thereto, the gears being mounted in the bearing independently of the shafts, and means including differential gearing operatively connecting said gears to the drive shaft.

3. In a driving axle, a drive shaft, a pair of axially aligned driven shafts, spur gears splined to the driven shafts near the inner ends thereof, bearings on each side of each spur gear and adjacent thereto, the gears being mounted in the bearings independently of the shafts, differential gearing driven from said drive shaft, and means including concentric shafts connecting the differential gearing to the spur gearing.

4. In a driving axle, an axle casing comprising a main section having laterally extending tubular casings, a section secured thereto and having webs provided with bearings for the axle shafts and transmission shafts, a section secured to said last named section and having a forwardly extending portion provided with bearings for the drive shaft and means for conducting lubricant from the main section of the casing to the bearings of the drive shaft.

5. In a driving axle, the combination of the main supporting section having an enlarged middle portion with an opening therein, axle shafts in said section having gearing at their inner ends, a casing section detachably secured to the main section of the axle over said opening and having web portions provided with bearings for said gearing, and a cover section cooperating with said casing section to support bearings for other shafts therein.

6. In a driving axle, the combination of a main supporting section having an enlarged middle part with a front opening therein, a casing section detachably secured to the main section over said opening and having webs extending into the main section, axle shafts in the main section of the axle having bearings in said webs, a driving shaft and an intermediate shaft supported in bearings in said casing section substantially above the horizontal plane of the axle shafts, gearing between the driving shaft and said intermediate shaft and gearing between said axle shafts.

7. In a driving axle, the combination of an axle section having an enlarged middle portion with an opening therein, a casing section detachably connected to said axle section over said opening and having three spaced webs extending into the axle section, bearings in said webs, gears each of which has hubs mounted in the bearings in the middle web and one of the outer webs, axle shafts withdrawably connected to said gears, and means for driving said gears.

8. In a driving axle, the combination of an axle section having an enlarged middle portion with an opening therein, a casing section detachably connected to said axle section over said opening and having three spaced webs extending into the axle section, bearings in said webs, gears each of which has hubs mounted in the bearings in the middle web and one of the outer webs, axle shafts withdrawably connected to said gears, differential gearing mounted in said casing section and connected to drive said gears, and a driving shaft for operating said differential gearing.

9. In a driving axle, the combination of an axle section having an enlarged middle portion with an opening therein, and a two-part casing section for covering said opening and having webs extending into the axle section for supporting the axle shafts therein, substantially as shown and described.

In testimony whereof I affix my signature.

ALFRED MOORHOUSE.